(No Model.)  2 Sheets—Sheet 1.
W. KUHN.
APPARATUS FOR THE PASTEURIZATION OF BEER.
No. 410,287. Patented Sept. 3, 1889.
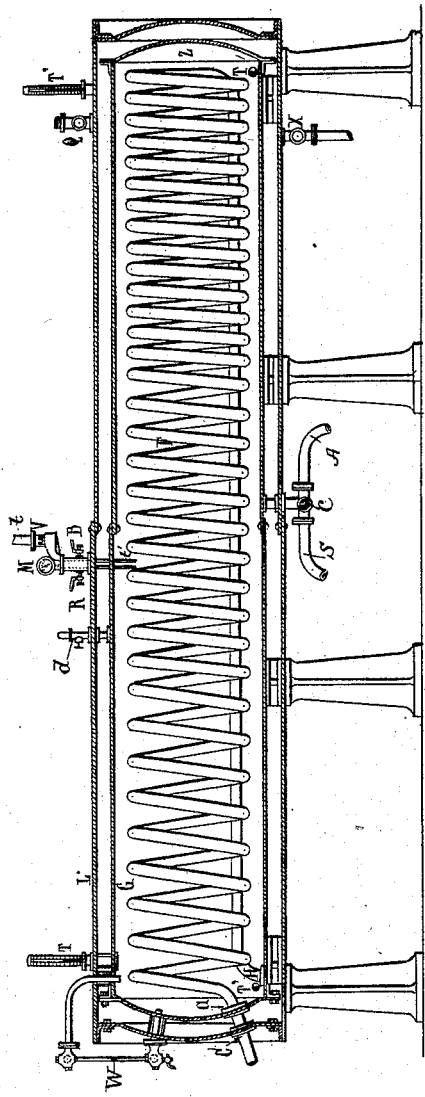
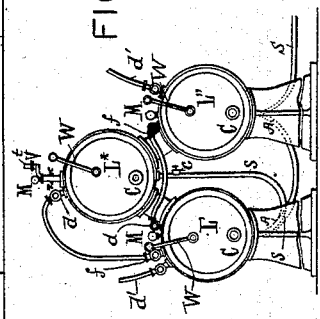
Attest:
Jas. K. M?Cathran
Philip ?
Inventor:
Williams. Kuhn
by
? ?
his Attorney

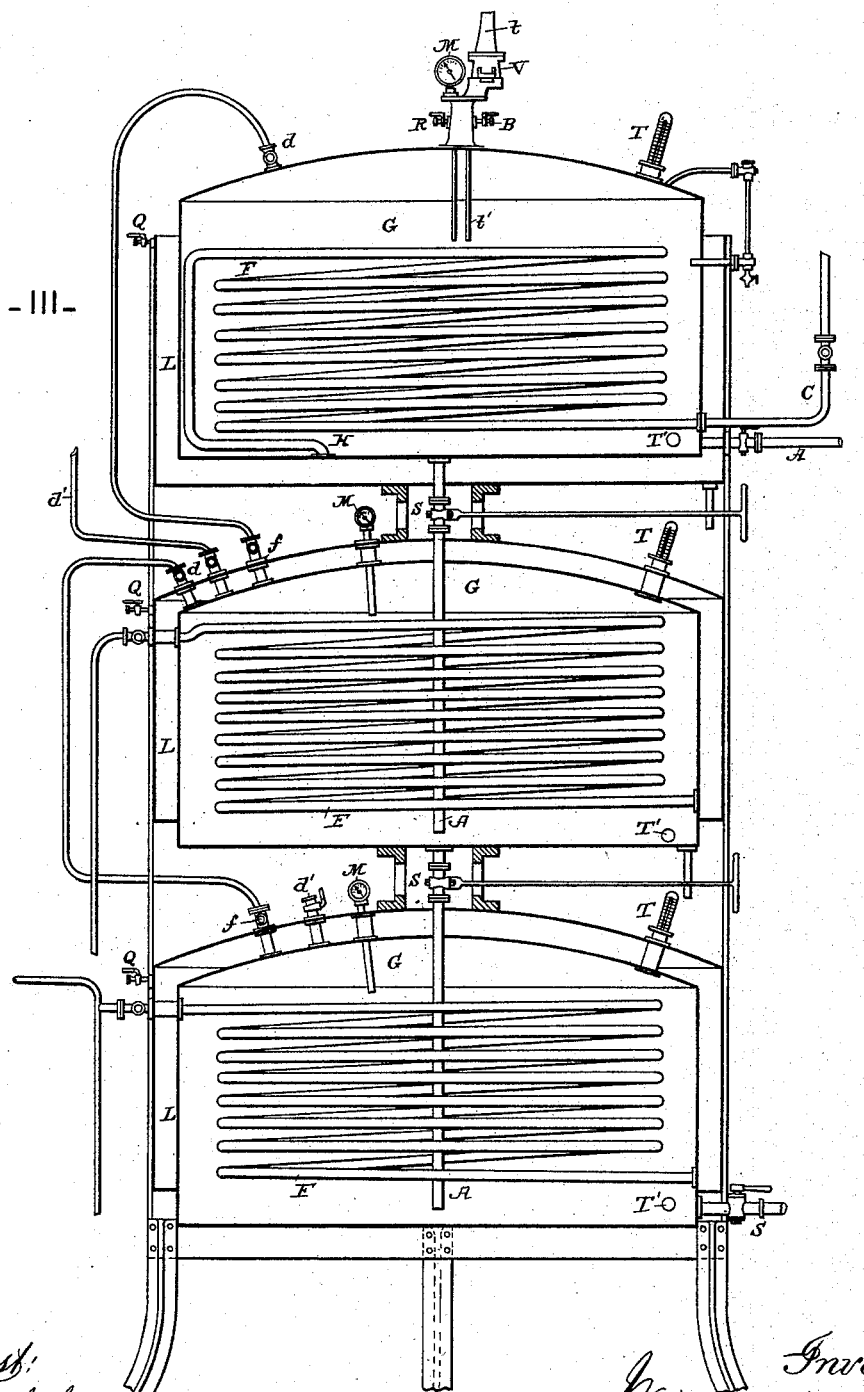

UNITED STATES PATENT OFFICE.

WILLIAMS KUHN, OF CLERMONT-FERRAND, FRANCE.

APPARATUS FOR THE PASTEURIZATION OF BEER.

SPECIFICATION forming part of Letters Patent No. 410,287, dated September 3, 1889.

Application filed April 29, 1889. Serial No. 309,011. (No model.)

*To all whom it may concern:*

Be it known that I, WILLIAMS KUHN, of Clermont-Ferrand, in the Republic of France, have invented an Improvement in Apparatus for the Pasteurization of Beer, Wine, and other Liquids, of which improvement the following specification is a full, clear, and exact description.

This invention relates to apparatus for pasteurizing beer, wine, and other liquids.

The apparatus constructed according to the said invention is designed for the pasteurization of liquids, and especially of beer, in large quantities in closed vessels, without loss of gas, followed by rapid cooling, for sale and transport in sterilized and hermetically-closed casks.

In order to render the industrial advantages which will result from the employment of the improved apparatus better understood, I will proceed to make some preliminary statements concerning the conditions which must be fulfilled in the manufacture of beer in order to meet with the requirements of the consumer and the causes which have heretofore opposed the transport of beer in casks.

The qualities of the beer result from two very different sets of conditions, which may be stated as follows: Physiological qualities—that is to say, such as are required by regarding the same from the standpoint of taste, and also as a nourishing liquid. Scientific and technical qualities: Normal composition, proper proportion of the constituting elements, purity of the yeast and wort, therefore limpidity and preservation. The first of the conditions can be obtained in the brewery by the employment of a process based upon the very complete experiments recently made in the German and Austrian brewery academies; and by adding to this process the use of pure yeast a normal regular manufacture is obtained which gives the desired taste, the softness, and momentary limpidity. I speak of the momentary limpidity because, however well the beer is made, it cannot be prevented from being from its nature an extremely-changeable liquid, carrying in itself the active and passive elements of its changeableness. The limpidity therefore must only be of short duration under the ordinary physical conditions of hermetical tightness and of temperature. Beer is essentially changeable and transformable either through foreign elements entering into its composition or from these elements themselves organized continuing their work of decomposing and slowly assimilating the organized materials. To meet the commercial requirements of limpidity, which exceed the scientific conditions in which the beer should be kept, recourse must be had to artificial means for insuring the preservation of the taste and of the limpidity. The first process employed was chemical or antiseptic; but this has been abandoned by reason of the inconveniences which arise from the addition of substances which remain in the beer and which are absorbed with them without sufficient guarantee of innocuousness. Recourse has therefore recently been had to physical processes for preserving beer unchangeable, and in this considerable progress has been made. Filtering has advanced the question of limpidity considerably, and when (as, for example, for bottled beer) it can be followed by heating or pasteurization carefully carried out a perfect result is obtained. The result of the pasteurization is shown by the general use made of the same in breweries. Beers which are of good quality at first, which is the result of the proper proportion of the parts combined by means of a good system of manufacture, are insured of a sufficient preservation for commercial purposes by the combined operations of filtering and pasteurization. After having been freed by filtering from the corpuscles in suspension, which would have caused decomposition, the beer is finished by heating, so as to remain in an unchanged condition in the state in which it was left, its component parts no longer being capable of transformation, by reason of the inertia of the traces of ferment which escape the action of the filter. The beer has acquired then an unchangeableness which can be regulated by the brewer according to the degree of heating to which it is subjected, at the same time avoiding every kind of particular taste when the operation is carefully conducted. It is the favorable result, already known in the whole world, resulting from the use of bottles that my apparatus increases a hundredfold by allowing the application of the same principle in a form which is infinitely more remunerative and commercially useful—that is to say, to casks of any capacity. My apparatus enables the transport of younger beer and the exportation and shipment of beer in casks of any dimensions, and completely changes the conditions of the commerce in beer, and will thus form the basis of a new departure for the breweries which adopt it, by rendering as easily transportable as wine a liquid which has heretofore been sold in casks only within comparatively local limits. The result which I seek to obtain for casks has already been the subject of investigations for the pasteurization in large quantities; but the various systems heretofore devised are liable to serious defects, the result to be attained being much more complex than appears at first sight by reason of the complex composition of beer.

In the accompanying drawings, which form part of this specification, apparatus constructed in accordance with the invention is represented.

Figure I is an end view of three connected apparatus. Fig. II is a vertical longitudinal section of one of said apparatus, and Fig. III is a central vertical section of another arrangement of connected apparatus.

In the arrangement represented in Figs. I and II each apparatus comprises an elongated receptacle or copper cylinder G, inclosed in a sheet-iron cylinder L, forming a casing around the former, the whole being arranged horizontally. The heads of the two cylinders can be dismounted to permit the cleaning and to afford access to the interior. It is sufficient to loosen the three flanges C $a$ H in order to remove the copper coil F for cleaning it. This coil, which extends lengthwise of the receptacle G, and nearly equals the same in length and diameter, enters the cylinder at $a$ and leaves it at H. Its convolutions are closer together at Z in proportion as they are farther away from the point of admission for the liquid which circulates in the interior of the coil, so that the several convolutions will act with the same effect upon the surrounding liquid, which thus enables the homogeneous heating or cooling in the entire apparatus. The cylinders are provided with a pressure-gage M, thermometers T' T, placed at its extremities, a water-glass W, and the like. At the lower part of the said cylinder or receptacle is moreover a two-way cock $c$, controlling the inlet A and outlet S.

Owing to the above-described arrangement of the convolutions of the coil F, the heating or cooling action will be uniform the entire length of the coil. After having traversed the coil the liquid enters the casing at H, circulates around the copper cylinder as it passes to the other end of the apparatus, and leaves it at Q. The pipe A forms the inlet for the admission of the beer and the pipe S the outlet for the discharge thereof. The receptacles G of the several treating apparatus L* L' L'' are connected in series with the outlet S from the cylinder G in the first apparatus L*, communicating with the inlet A of the next apparatus L', and the outlet of this latter with the inlet of the third apparatus L'', so that the beer can be transferred from one of them to the other. The upper parts of the receptacles or cylinders G in the different apparatus are also connected with each other by pipes $d$ $f$, provided with valves or cocks. The first apparatus of the series in which the heating is effected is provided with a safety-valve V, having a pipe $t$ for carrying off any beer which may pass the valve, and a supply-pipe $t'$, which projects into the cylinder G, so as to enter the beer when the cylinder is filled. It is also provided with a valved pipe R, for admitting compressed air or gas, and a whistle B. The second and third apparatus L' L'' of the series are preferably provided also with a valve-pipe $d$, for admitting compressed air or gas directly thereinto.

The operation is as follows: The ice-cold effervescent and filtered beer is introduced under pressure into the receptacle or cylinder G of the first apparatus L* by its inlet A. When the cylinder is full to the top, the cock $c$ is closed and hot water is admitted into the coil F at C. When the beer has been heated by the circulation of the hot water to the desired degree and a uniform temperature obtained, the hot beer is transferred under pressure to the next apparatus L'. For this purpose pure cold compressed air or carbonic-acid gas is introduced through the pipe $d'$ into the cylinder G of the second apparatus. The valve or cock in said pipe $d'$ is then closed. Communication between the upper parts of the two cylinders is established through the pipe $f$ $d$, and the cock $c$ is turned so as to discharge the hot beer into the cylinder G of the second apparatus L', where it meets a counter-pressure, which prevents effervescence. To hasten the transfer, pure air or carbonic acid under higher pressure is or may be introduced by the cock R. In the apparatus L' the temperature of the beer is reduced by cold water, which circulates in the coil F and jacket L of that apparatus, and when the beer is at or sufficiently near the temperature of the cold water it is forced into the cylinder G of the third apparatus L'' with like precautions. In the coil F and jacket L of this apparatus the non-congealable liquid of an ice-machine is circulated, and when the beer has returned to its original temperature it is forced with the same precautions into sterilized and hermetically-closed shipping casks or kegs.

Instead of using a number of the apparatus or series, one of them may be used singly by first introducing hot water into the coil F and jacket L thereof, and when the beer has been heated to the desired temperature passing cold water or non-congealable liquid of an ice-machine through the same coil and jacket, these, if desired, being previously emptied by the draw-off pipe X. When the beer has returned to its original temperature and pressure, compressed pure air or carbonic acid is caused to enter through the cock R and the beer is forced by the isobarometric apparatus into sterilized and hermetically-closed casks.

In Fig. III is represented an arrangement in which the coils are placed vertically. In this case the convolutions of the coil can be arranged at regular distances apart. The coils, as before, nearly equal in diameter and length the corresponding dimensions of the receptacles. The casing or jacket for the receptacles in which the heating is effected is placed at the lower part, while the jackets for the cooling-receptacles are placed at the upper part. The differences of density of the hot and cold liquids are thus compensated for, and consequently the heating and cooling of the liquid are uniform.

The apparatus is composed of three superposed copper receptacles G, provided with a casing L and coils F, pressure-gages M, thermometers T' T, and the like, as in the above-described arrangement. The upper apparatus being full of beer, the hot liquid is caused to circulate from C to Q through the coil F and the casing L. When the beer is at the desired degree, a higher pressure of carbonic acid is produced in R than that in the apparatus, the communication $d\ f$ is opened, and in proportion as the beer enters G it meets with a counter-pressure, which prevents the effervescence. The air or gas contained in the central apparatus rises and replaces in the upper apparatus the liquid which descends. The central apparatus serves to cause the circulation of ordinary cold water, and the lower apparatus serves to cause the circulation of the non-congealable liquid. The beer is caused to pass from one to the other successively, and thence to the casks with the same precautions as in the previous operations.

I claim as my invention or discovery—

1. A series of apparatus for pasteurizing, each apparatus comprising a receptacle for the liquid to be treated, a coil in length and diameter nearly equal to the corresponding dimensions of the receptacle in which it is placed, and a pressure-gage and thermometers for said receptacle, the several apparatus having their lower parts connected by pipes with valves or stop-cocks and their upper parts similarly connected, and the first at least of the series being provided with a safety-valve, substantially as described.

2. A series of three apparatus for pasteurizing, each apparatus comprising a receptacle for the liquid to be treated, a coil in said receptacle approximating in length and diameter the corresponding dimensions of the receptacle, a pipe and stop-cock for admitting air or gas under pressure into the receptacle, and a pressure-gage and thermometers for said receptacle, the several receptacles being connected with one another at their lower parts by pipes with valves or cocks and at their upper parts by pipes similarly provided, and the first apparatus of the series being further provided with a safety-valve, substantially as described.

3. A pasteurizing apparatus comprising an elongated horizontal receptacle, a helical coil extending lengthwise of said receptacle and having the convolutions more closely set toward the outlet end of the coil, substantially as described.

In testimony whereof I have signed this specification in the presence of two subscribing witnesses.

WILLIAMS KUHN.

Witnesses:
R. J. PRESTON,
PAUL GIRALFE.